US008699332B2

(12) United States Patent
Hogan et al.

(10) Patent No.: US 8,699,332 B2
(45) Date of Patent: Apr. 15, 2014

(54) METHOD AND SYSTEM FOR DETERMINING AND IMPLEMENTING POLICY CONTROLS IN A COMMUNICATIONS NETWORK

(75) Inventors: Joe Hogan, Malahide (IE); Alan McNamee, Dublin (IE); Cameron Ross Dunne, Newbridge (IE); Gary Rieschick, Louisburg, KS (US)

(73) Assignee: Openet Research Limited, Dublin (IE)

( * ) Notice: Subject to any disclaimer, the term of this patent is extended or adjusted under 35 U.S.C. 154(b) by 475 days.

(21) Appl. No.: 12/960,980

(22) Filed: Dec. 6, 2010

(65) Prior Publication Data
US 2012/0140620 A1 Jun. 7, 2012

(51) Int. Cl.
*H04L 12/26* (2006.01)

(52) U.S. Cl.
USPC .......................... 370/230; 370/236; 370/252

(58) Field of Classification Search
USPC ............. 370/229, 230, 230.1, 231, 232, 235, 370/236, 237, 252, 254, 395.2, 395.21
See application file for complete search history.

(56) References Cited

U.S. PATENT DOCUMENTS

| 4,979,118 | A * | 12/1990 | Kheradpir | 701/117 |
| 7,194,554 | B1 * | 3/2007 | Short et al. | 709/246 |
| 7,760,643 | B2 * | 7/2010 | Kim et al. | 370/235 |
| 7,917,625 | B1 * | 3/2011 | Cook | 709/226 |
| 8,346,225 | B2 * | 1/2013 | Raleigh | 455/414.1 |
| 8,559,966 | B2 * | 10/2013 | Bernini et al. | 455/452.2 |
| 2002/0172222 | A1 * | 11/2002 | Ullmann et al. | 370/468 |
| 2005/0013244 | A1 * | 1/2005 | Parlos | 370/229 |
| 2006/0106599 | A1 * | 5/2006 | Horvitz | 704/219 |
| 2006/0140119 | A1 * | 6/2006 | Yeh et al. | 370/235 |
| 2009/0213871 | A1 * | 8/2009 | Carlson et al. | 370/462 |
| 2010/0097932 | A1 * | 4/2010 | Wu | 370/235 |
| 2010/0142373 | A1 | 6/2010 | Jin et al. | |
| 2010/0150003 | A1 | 6/2010 | Andreasen et al. | |
| 2012/0140620 | A1 * | 6/2012 | Hogan et al. | 370/230 |
| 2012/0314573 | A1 * | 12/2012 | Edwards et al. | 370/230.1 |
| 2013/0064197 | A1 * | 3/2013 | Novak et al. | 370/329 |
| 2013/0107825 | A1 * | 5/2013 | Cherian et al. | 370/329 |
| 2013/0111046 | A1 * | 5/2013 | Scherer et al. | 709/228 |

FOREIGN PATENT DOCUMENTS

EP 2197152 A1 6/2010
WO 2010060478 A1 6/2010

OTHER PUBLICATIONS

Unknown Author, "3GPP TS 23.203: 3rd generation partnership project; technical specification group services and system aspects; policy and charging control architecture," Release 9, V9.4.0, Mar. 2010, 120 pages.
Unknown Author, "Policy control based on network condition," 3GPP TSG SA WG2 Meeting #81, Oct. 11-15, 2010, Prague, Czech Republic, 4 pages.

(Continued)

*Primary Examiner* — Kwang B Yao
*Assistant Examiner* — Nguyen Ngo
(74) *Attorney, Agent, or Firm* — Withrow & Terranova, P.L.L.C.

(57) ABSTRACT

A computer-implemented method of determining policy control decisions in a telecommunications network. The method comprises the steps of receiving a predictive indicator from a forecasting system, wherein the predictive indicator includes predictive network resource utilization information, responsive to receiving a service request from a gateway, determining a policy decision based on the predictive indicator, and sending the policy decision to the gateway.

29 Claims, 6 Drawing Sheets

(56) References Cited

OTHER PUBLICATIONS

Unknown Author, "Predictive congestion management-improving subscriber quality of experience by intelligently addressing the causes of RAN congestion," OPENET, White Paper, Sep. 2, 2010, 10 pages.

Extended European Search Report for application 11188028.2 mailed May 15, 2012, 13 pages.

* cited by examiner

METHOD AND SYSTEM FOR DETERMINING AND IMPLEMENTING POLICY CONTROLS IN A COMMUNICATIONS NETWORK

FIELD OF THE DISCLOSURE

This invention relates to a method and system for determining and implementing policy controls in a communications network.

BACKGROUND

For years, operators have been forced to compete for new subscribers on price alone. However, there are now indications that network quality, especially among high-end customers, is again becoming an important differentiator between carriers. This provides an opportunity for operators to claw back some pricing power, and win new customers.

In particular, data utilization for mobile service providers is already growing at an amazing 60% Compound Annual Growth Rate (CAGR), and accordingly, there will be substantial performance demands on operators. Analysts and network equipment manufacturers (NEMs) alike believe mobile data networks will grow at 100% CAGR for the next five years. This represents a great opportunity for operators.

However, the profitability of these networks is being threatened by the cost of servicing customer demand. As data usage increases and more demands are placed on network resources, some operators find that service quality is becoming increasingly spotty, as networks become overloaded and capacity is crunched. The growing popularity of smart devices and bandwidth-intensive mobile applications and services (e.g., video, gaming, peer-to-peer video, downloads and peer-to-peer file sharing, secure proxies, virtual private networks and VoIP) will continue to exasperate this problem.

One of the most significant factors affecting service quality in this context is insufficient bandwidth to satisfy the requirements in a portion of the network, which encompasses the entire subscriber data path from the device to the IP core network, known as the Radio Access Network (RAN). This part of the network is very susceptible to rapid changes of demand based upon subscribers' behavior. In general, insufficient bandwidth in this portion of the network is referred to as RAN congestion.

To relieve congestion in the RAN, operators cannot pursue sustainable strategies of increasing bandwidth, i.e., network capacity, in the face of what appears to be insatiable demand for capacity by subscribers, and hence they have considered alternative practices.

EP 2197152, which is incorporated herein by reference, is concerned with policy management systems in a telecommunications network and in particular, with the determination of capability information of a gateway by a policy management system in order to effectively subscribe to an application event or make a policy decision for a service. The capability information of the gateway comprises application event detection capability, application control capability, and security defense capability. Thus, the policy management system of EP 2197152 makes policy and charging decisions based on capability information of the gateway.

US 2010/0142373, which is incorporated herein by reference, is also concerned with policy management systems in a telecommunications network. On receipt of a service request from a gateway, the policy management system accesses a first plurality of policy and charging control rules defining a criterion for detecting an encapsulated packet flow and an event trigger for reporting the detected flow. A packet flow optimization application utilizes the first plurality of policy and charging control rules to detect the encapsulated packet flow and the encapsulated packet flow is transmitted from the gateway to the policy management system. The policy management system determines and transmits to the gateway a second plurality of policy and charging control rules based on the detected flow. Thus, the policy management system of US 2010/0142373 makes policy and charging decisions based on a detected encapsulated packet flow in the network.

US 2010/0150003, which is incorporated herein by reference, provides a gateway arranged to determine Real-time Transfer Protocol, (RTP), quality metrics for a specific flow in a network, such as packet loss, packet jitter, and packet delay. The gateway is arranged to allow or deny a service request based on the determined quality metrics and an active set of policy and charging control rules. Thus, the gateway enforces policy and charging control rules based on RTP quality metrics.

WO 2010/060478, which is incorporated herein by reference, discloses a policy management system comprising a plurality of policy templates. On receipt of a service request from a gateway, the policy management system determines an appropriate policy template for the service and arranges for a suitable policy for the service based on the policy template, subscriber profile information and service description information.

Some operators have attempted to address RAN congestion with trigger-based policies. This approach involves modifying core components within the network so that they generate triggers, or alerts, when certain usage levels breach thresholds. However, this approach is usually costly to deploy, due to the requirement of modifying components so that they can perform this extra functionality in a very low-latency environment. An alternative approach taken by operators has been to deploy network probes or Deep Packet Inspection (DPI) platforms to detect RAN congestion. Typically this approach requires the deployment of new hardware to measure the network activity, in a process that is both costly and time consuming. Therefore, this approach does not scale well and so it is not suitable for wide-scale permanent deployment.

An object of the present invention is to provide a more effective method for determining policy decisions in a telecommunications network and in particular, to provide an effective method for optimizing network capacity.

SUMMARY

Accordingly, the present invention provides a computer-implemented method of determining policy control decisions in a telecommunications network, the method comprising the steps of:
receiving a predictive indicator from a forecasting system, wherein the predictive indicator includes predictive network resource utilization information;
responsive to receiving a service request from a gateway, determining a policy decision based on the predictive indicator; and
sending the policy decision to the gateway.

Thus, the utilization of the predictive information by the policy management system enables the policy management system to better manage capacity through proactive and precise controls that enforce policies in different problem areas before congestion negatively impacts networks or the customer experience for certain customers, such as high value customers, or low-value customers consuming a service with a high priority, for example. This allows operators to be more precise and less invasive with their network monitoring.

If the predictive indicator indicates a likelihood of increased demands for bandwidth due to the occurrence of a once-off or irregular event, for example, the policy management system will employ this information in applying policy control decision, and perhaps charging control decision logic to the service request, in determining whether to allow or deny the service request. Thus, the present invention enables operators to proactively predict and address network congestion issues, enabling operators to compete on delivering a better Quality of Experience (QoE).

Informed decisions come with real visibility into what might happen in a network, which could be evaluated, for instance, either daily, bi-daily, or hour-to-hour, and predictive capabilities providing knowledge about traffic behaviors and congestion before it happens. If predictive inputs about congestion are fed in a daily, bi-daily or hour-by-hour manner to the policy management system, then operators can configure policies according to availability of resources.

Preferably, the step of determining a policy decision is further based on the service request.

Preferably, the service request comprises at least one of the subscriber identity, user equipment identity, user equipment location, identity of the cell containing the user equipment, and information regarding the requested service specified in terms of the source IP address and port number, the destination IP address and port number, and the network protocol type.

Alternatively or in addition, the step of determining a policy decision is further based on subscriber data.

Preferably, the method comprises extracting a subscriber identifier from the service request, and utilizing the subscriber identifier to retrieve subscriber data.

Preferably, the subscriber data comprises at least one of the subscriber's name, age, subscription type, subscription add-ons, account balance, total usage allowances, remaining usage allowances, allowed service information, and current location information.

Enforcing rigid or strict policies without regard for the subscribers' needs in certain areas of the network at particular times and regardless of whether the networks are congested or not, means operators run the risk of labeling usage as "excessive" while ignoring the fact some of the effected subscribers may be high Average Revenue Per User (ARPU) subscribers, and therefore amongst the most valuable subscribers. In contrast, the present invention envisages utilizing subscriber data, in addition to predictive indicators, to ensure that capping or throttling subscribers is performed in a careful and deliberate manner, on a case-by-case basis.

The present invention provides the controls to ensure that network resources are appropriately distributed based on different dimensions such as service plan, device type, and service type e.g. premium versus non-premium content. This invention allows operators to model the impact on Quality of Service (QoS), to deploy targeted policy control actions to give customers the best and most appropriate QoE.

Alternatively, or in addition, the step of determining a policy decision is further based on any one of historical data, subscriber data, real-time network resource utilization, ongoing service information, operator policy information and network restrictions.

Preferably, the method further comprises receiving ongoing service information from an application layer function, wherein the policy decision is further based on the ongoing service information.

Thus, if resource availability is determined according to actual traffic and sophisticated predictions about where traffic will be in upcoming hours (based on trending of network utilization during peak and non-peak hours in different cell sites and regions), operators can throttle traffic as it dynamically changes and before QoE is impacted. Smarter allocation of capacity will help operators better manage peak period loads, as well as help deliver a better and more consistent QoE.

Preferably, the method further comprises transmitting to the forecasting system, a request for a predictive indicator.

Preferably, the method further comprises transmitting to the forecasting system periodically, a request for a predictive indicator.

Alternatively, the method further comprises subscribing to the forecasting system to periodically receive a predictive indicator.

Preferably, the subscribing comprises transmitting a request.

Preferably, the request comprises at least one parameter indicating desired predictive network resource utilization information.

Preferably, the at least one parameter includes any combination of geographical location, specific types of resources, specific resources, dates and times, and a contribution or load factor range. For example, the request may include a parameter indicating a desire for information relating to supply resource utilization information regarding all Cell Controller resources. Another example of a request parameter may indicate a desire for information relating to supply resource utilization information regarding all resources in Manhattan for the next 24 hours, or supply resource utilization information for all resources that are expected to have a load factor greater than 95%. Preferably, the method further comprises the step of receiving from a policy configuration system, policy control decision logic, and wherein the policy decision is determined in accordance with the policy control decision logic and the predictive indicators.

Alternatively, the method further comprises the step of receiving from a policy configuration system, policy and charging control decision logic, and wherein the policy decision is determined in accordance with the policy and charging control decision logic and the predictive indicators.

Alternatively, the method further comprises the step of receiving from a policy configuration system, policy control decision logic derived from predictive indicators received from the forecasting system, and wherein the policy decision is determined in accordance with the predictive indicator derived policy control decision logic and the predictive indicators.

Alternatively, the method further comprises the step of receiving from a policy configuration system, policy and charging control decision logic derived from predictive indicators received from the forecasting system, and wherein the policy decision is determined in accordance with the predictive indicator derived policy and charging control decision logic and the predictive indicators.

Preferably, the policy management system is arranged to receive from a policy configuration system, configuration information for communicating with the forecasting system.

Preferably, the configuration information comprises at least one of:

a) a network address and a preferred access method to be employed by the policy management system to access the forecasting system;

b) identification and authentication information to be employed by the policy management system to access the forecasting system; and
c) a frequency with which the policy management system is to access the forecasting system.

Preferably, the policy management system is further arranged to notify the forecasting system of an identifier of resources whose resource utilization is likely to be affected by the policy decision based on the predictive indicator, and sent to the gateway.

There is further provided a policy management system in a telecommunications system, the policy management system arranged to:
receive a predictive indicator from a forecasting system, wherein the predictive indicator includes predictive network resource utilization information;
responsive to receiving a service request from a gateway, determine a policy decision based on the predictive indicator; and
send the policy decision to the gateway.

There is further provided a computer program product comprising a non-transitory computer readable medium encoded with computer executed instructions, which when executed in a computing device, is arranged to carry out the following steps:
receive a predictive indicator from a forecasting system, wherein the predictive indicator includes predictive network resource utilization information;
responsive to receiving a service request from a gateway, to determine a policy decision based on the predictive indicator; and
send the policy decision to the gateway.

In a second aspect of the present invention, there is provided a computer-implemented method of determining policy control decisions in a telecommunications network, the method comprising the steps of:
receiving policy control decision logic from a policy configuration system, wherein the policy control decision logic is derived from a predictive indicator including predictive network resource utilization information;
responsive to receiving a service request from a gateway, determining a policy decision based on the policy control decision logic; and
sending the policy decision to the gateway.

In this aspect of the invention, the policy configuration system is arranged to receive the predictive indicator from the forecasting system and is arranged to define policy control decision logic based on the predictive indicator. The policy management system is then configured in accordance with the policy control decision logic, and makes policy decisions for service requests in accordance with the policy control decision logic, which are accordingly, based on the predictive indicators.

Preferably, said step of receiving policy control decision logic includes receiving charging control decision logic and wherein the charging control decision logic is derived from a predictive indicator including predictive network resource utilization information, and said policy decision is further based on the charging control decision logic.

In a third aspect of the present invention, there is provided a telecommunications system comprising:
a policy management system;
a policy configuration system, which is arranged to transmit to the policy management system, policy control decision logic;
a network capacity planning and forecasting system, arranged to transmit to the policy management system, predictive indicators;
a gateway, arranged to transmit to the policy management system, service requests;
wherein the policy management system is arranged to transmit a policy decision to the gateway in response to a service request; and
wherein the policy decision is determined in accordance with the policy control decision logic and the predictive indicators.

Preferably, the policy control decision logic further comprises charging control decision logic.

In a fourth aspect of the present invention, there is provided a computer-implemented method of configuring a policy management system in a telecommunications network, the method comprising the steps of:
receiving configuration parameter from an operator;
receiving from a forecasting system, a predictive indicator including predictive network resource utilization information;
generating policy control decision logic based on the configuration parameters and the predictive indicator; and
transmitting to the policy management system, the policy control decision logic.

Preferably, the policy control decision logic further comprises charging control decision logic.

Preferably, the method further comprises transmitting to the policy management system, configuration information to enable the policy management system to communicate with the forecasting system.

Preferably, the configuration information comprises at least one of:
a) a network address and a preferred access method to be employed by the policy management system to access the forecasting system;
b) identification and authentication information to be employed by the policy management system to access the forecasting system; and
c) a frequency with which the policy management system is to access the forecasting system.

Alternatively, or in addition, the method further comprises transmitting to the forecasting system, configuration information to enable the forecasting system to communicate with the policy management system.

Preferably, the configuration information comprises at least one of:
a) a network address and a preferred access method to be employed by the forecasting system to access the policy management system;
b) identification and authentication information to be employed by the forecasting system to access the policy management system; and
c) a frequency with which the forecasting system is to update the policy management system with a predictive indicator.

Advantageously, the method of the present invention substantially mitigates the likelihood of congestion in the network. By understanding the different causes of congestion and their impact on subscribers, operators can take proactive actions to thereby curb or diffuse congestion problems in the network before congestion occurs. Thus, by combining powerful predictive congestion analysis with proactive policy controls, operators can optimize capacity of the network.

Further benefits and advantages of the invention will become apparent from a consideration of the following detailed description given with reference to the accompanying drawings, which specify and show preferred embodiments of the invention.

BRIEF DESCRIPTION OF THE DRAWINGS

Embodiments of the invention will now be described, by way of example, with reference to the accompanying drawings, in which.

DETAILED DESCRIPTION

The context of the present invention is a communications network, such as a mobile phone network as specified by the 3GPP. In particular, the embodiments described herein relate to the architecture specified by the 3GPP in [23.203], and further specified in sub-specifications [29.212, 29.213, 29.214, and 29.215], including modifications to and additional components within the architecture.

Figure 1:
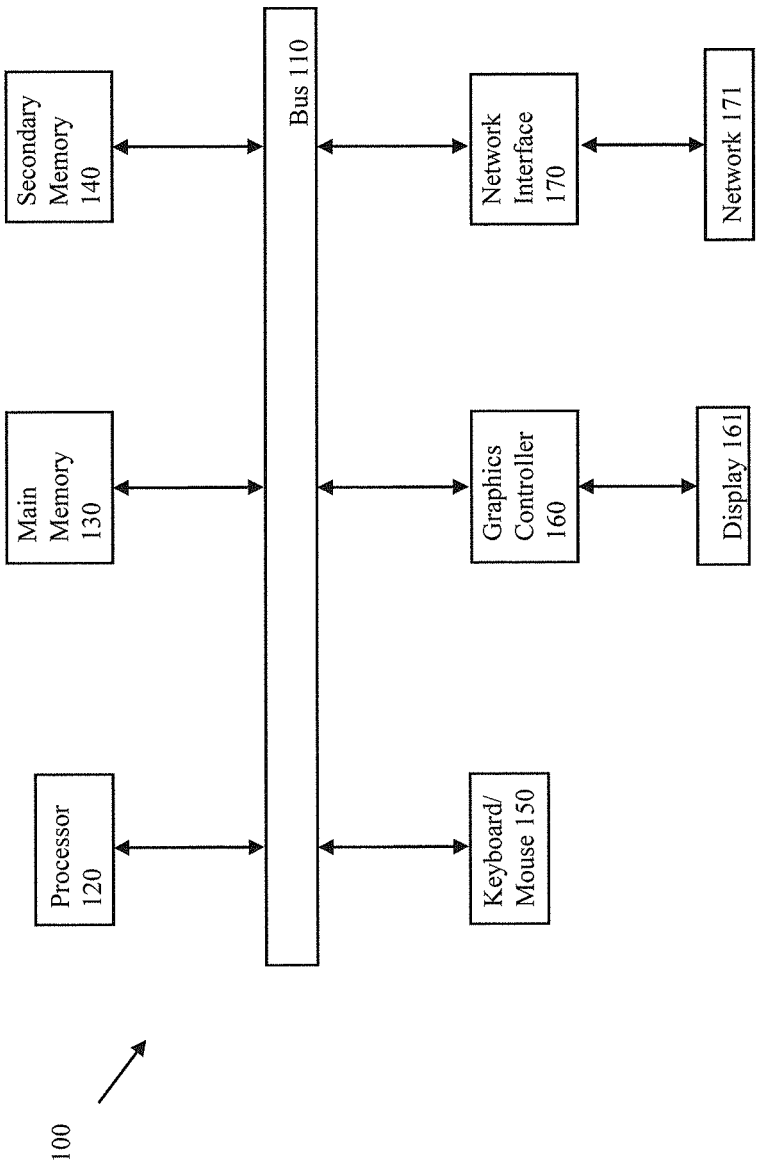
FIG. 1 illustrates a conventional system suitable for implementing the present invention.

Referring to FIG. 1, there is illustrated a conventional system 100 suitable for implementing the embodiments of the invention described herein. The system 100 includes a bus 110 for enabling communication between various components of the system.

The system comprises at least one processor 120. The processor is a logical unit arranged to perform logical calculations and operations, required for the implementation of the present invention. In a preferred embodiment, the system 100 comprises multiple processors, in a commodity multi-core processor format.

The system 100 further comprises a main memory storage area 130. The processor 120 is capable of accessing the main memory storage area 130 via the bus 110, to temporarily store instructions relevant to the implementation of the present invention, and associated data while it is being manipulated in accordance with the invention. In the preferred embodiment, the main memory 130 is Random Access Memory (RAM).

The system 100 also comprises a secondary memory storage area 140 arranged to provide persistent storage. The secondary memory storage area 140 is used to store instructions and configuration data for implementing and operating the present invention. In one embodiment, the secondary memory storage area 140 is at least one commodity hard disk.

The processor 120 is arranged to transfer the instructions for implementing the invention from the secondary memory storage area 140 to the main memory storage area 130 via the bus 110 for execution.

A keyboard and mouse 150 is provided to enable a system operator to input information to the system, such as operating instructions or configuration information. The system also comprises a graphics controller 160, for receiving information from the components of the system via the bus 110, and manipulating the information for presentation on a display 161, such as a computer monitor or screen.

A network interface 170 provides a communications link between the bus 110 and a computer network 171. This communications link can be used to exchange instructions, configuration data, and operating data with other systems. In the preferred embodiment, the network interface 170 is an Ethernet card arranged to connect to a Local Area Network (LAN), which may in turn be connected to a Wide Area Network (WAN) or the Internet.

Figure 2:
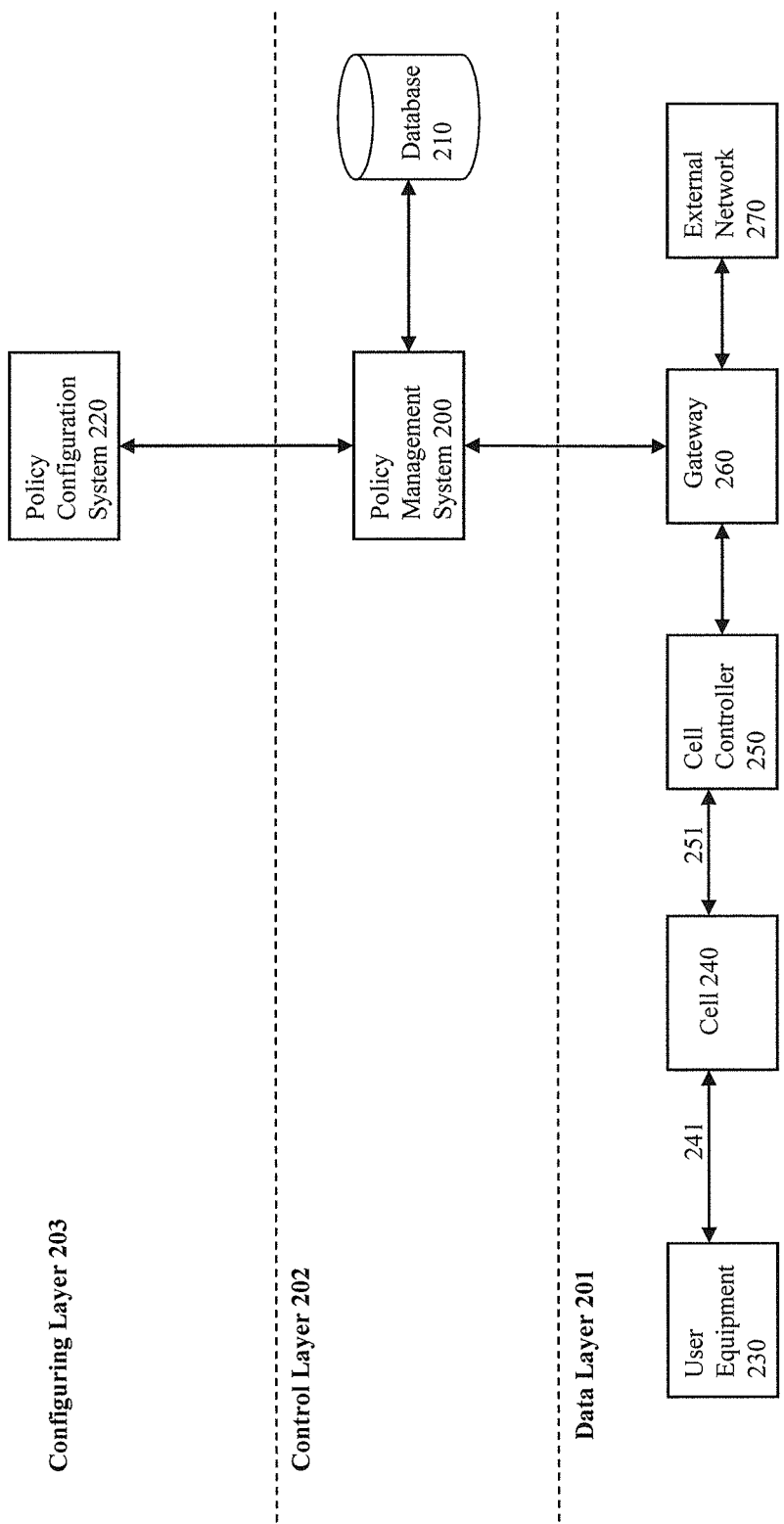
FIG. 2 illustrates a conventional telecommunications network comprising a policy management system.

Referring to FIG. 2, there is illustrated a typical telecommunications network, such as a 3G network comprising a data layer 201, a control layer 202, and a configuration layer, 203.

As illustrated in FIG. 2, within the data layer 201, there is provided user equipment, 230, for example, a mobile phone, PDA, or tablet device, to enable a subscriber to access IP based services over a wireless network. To this end, the user equipment 230 is arranged to communicate with a cell, 240 via a radio network, 241. In the preferred embodiment of a 3G network, the cell 240 is referred to as a Node B. In an alternative embodiment within a GSM network, the cell 240 is referred to as a base transceiver station (BTS).

A cell controller 250 is provided to manage at least one cell 240, and traffic is communicated between the cells 240 and the cell controller 250 via a backhaul network, 251. The cell controller 250 is generally known as a radio network controller (RNC) when employed in a 3G network, and as a base station controller (BSC) within a GSM network.

The telecommunications network further comprises a gateway 260 to control a flow of IP traffic from the cell controllers 250 to an external network 270. The gateway 260, or a gateway GPRS support node (GGSN) as it is known in 3G networks, comprises a policy and charging enforcement function (PCEF), which is arranged to implement or apply policy and charging decisions received from the policy management system 200. The external network of FIG. 2 is a core network with which the cell controller exchanges IP traffic. Preferably, in the case of a 3G telecommunications network, the external network 270 is the Internet, or a network that provides connectivity to the Internet.

A policy management system 200 is provided within the control layer 202 of the communications network. The policy management system 200 is arranged to execute policy and charging control functions to determine suitable policy and charging decisions. In particular, these decisions determine if the gateway should allow a specific flow of IP traffic between a subscriber and the external network 270, and if so, under which circumstances. In a 3G network, the policy management system is generally referred to as a policy and charging rule function (PCRF).

An example of the operation of the policy management system 200 occurs when a pre-paid subscriber tries to download a video. If the subscriber's credit balance is sufficient, then he will be allowed to download the video with a service level that is appropriate for his subscription rate. In a further extension of this example, the subscriber can temporarily purchase an enhanced service level for the duration of the video download. In this case, the policy management system 200 will continue to allow the video download, albeit with an increased service level. An alternative example occurs when a corporate subscriber tries to access her email. In this case the corporate subscription allows access to email services, but prohibits access to all other data services. An additional alternative example occurs in the context of a post-paid subscriber who configures his profile so that all data services are blocked when he is roaming, in order to prevent unexpectedly high usage charges. In this example, the policy management system will need to consider the subscriber's location, and the network that he is using, when determining if data services should be allowed.

A policy configuration system 220 provided in the configuration layer 203 of the telecommunications network provides a means for a network operator to configure the policy management system 200 with information or decision logic regarding policy and charging control rules.

In addition to the policy and charging control rules, the policy management system 200 employs a variety of different types of parameters in order to determine appropriate policy and charging control decisions, such as restrictions of the network, operator policy, subscription data, and ongoing service information. In one embodiment, an application layer function (not shown) is arranged to monitor and provide to the policy management system 200, dynamic session information of the data layer.

The subscription data typically includes information such as the subscriber's name, age, subscription type, subscription add-ons, account balance, total usage allowances, remaining usage allowances, allowed service information, and current location information. These parameters may be available locally or may, as illustrated, be accessed from a subscriber database that is stored at a remote database 210.

The policy management system 200 is required to make a policy and charging control decision each time that the gateway 260 receives a new IP traffic flow. Typically, this occurs when the subscriber uses their user equipment 230 to invoke an IP based service that is hosted on a device reachable over the external network 270. In this case, the user equipment 230 sends a service request to the cell 240 using the radio network 241. The service request preferably includes a sufficient number of parameters to describe the service and the service provider on the external network. For example, these parameters may include a user equipment identity, a subscriber identity, a source IP address and port number, a destination IP address and port number, and a network protocol type.

The cell 240 then forwards the service request to the cell controller 250 using the backhaul network 251. Next the cell controller 250 forwards the service request to the gateway 260.

On receipt of the service request, the gateway 260 sends a request to the policy management system 200 to determine the policy and charging control rules that it should enforce. The service request generally comprises parameters such as an identifier of the user equipment 230, requested service information, and, an identifier of the cell 240, which is utilized by the policy management system 200 in determining policy and charging decisions. In the case that the telecommunications network is a 3G network, the policy and charging control request is preferably transmitted using the Gx interface.

The policy management system 200 then makes a policy and charging control decision in accordance with the rules defined by the network owner. The policy management system 200 informs the gateway 260 of the policy and charging control decision. Depending on the policy and charging control decision, the gateway 260 will either discard the service request, or else forward it to the external network 270 so that it can be fulfilled. In the latter case, a resulting service response is returned from the core network 270 to the gateway 260, and subsequently to the cell controller 250, and then the cell 240, before being finally returned to the user equipment 230.

Figure 3:
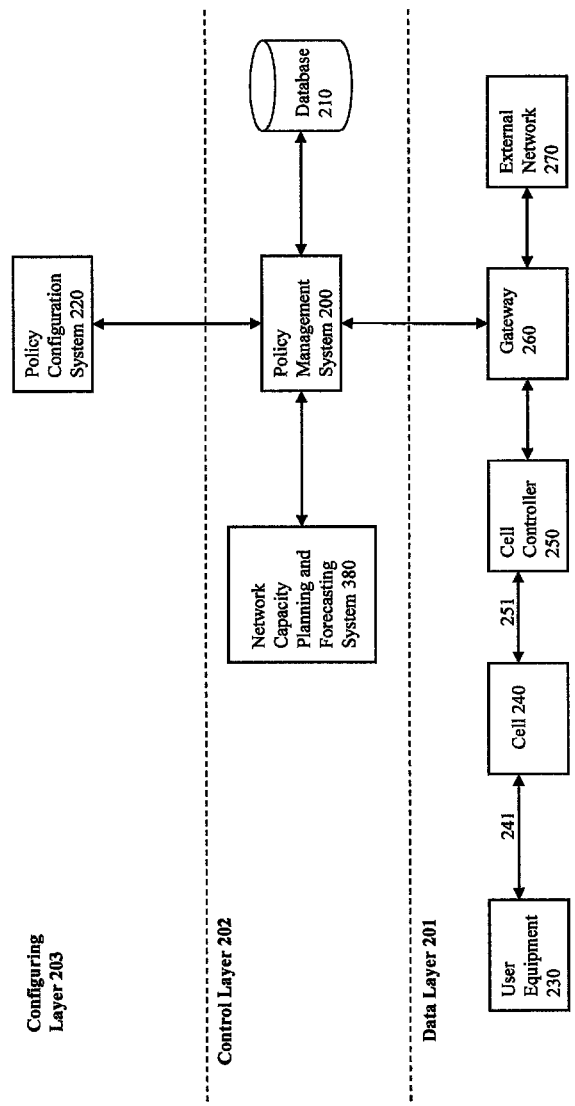
FIG. 3 illustrates a telecommunications network comprising a policy management system and a network capacity planning and forecasting system, according to an embodiment of the invention.

Referring now to FIG. 3, there is illustrated a telecommunications system according to an embodiment of the present invention. In addition to the components of the telecommunications network of FIG. 2, the telecommunications network of FIG. 3 further comprises a network capacity planning and forecasting system 380 in the control layer 202.

The network capacity planning and forecasting system 380 includes a predictive congestion management function, and is arranged to anticipate or predict potential network resource utilization within the telecommunications network at a given time. In this embodiment, the network capacity planning and forecasting system 380 utilizes predictive information relating to calendar and event awareness, for example, special events, and seasonality, to predict times and durations for which the telecommunications network is expected to deviate from a basic resource utilization range for a given geographical area. For example, it may predict that a particular cell in a city will be exceptionally busy on a Sunday afternoon due to the fact that there will be a high-profile international sports event within the cell, whereas the same cell will be significantly under-utilized every other Sunday afternoon the same season.

In the embodiment, in addition to the predictive information, the network capacity planning and forecasting system 380 is selectively arranged to utilize historical data, such as previous network activity, trending data, i.e. data projecting expected behavior of the network, subscriber data, and real-time network resource utilization information, which may be determined from a network management system (not shown) or an application layer function
(not shown) arranged to monitor the network resource utilization in real time.

Alternatively, or in addition, historical data, trending data, subscriber data, and real-time network resource utilization information is employed by the policy management system 200 in determining a policy decision.

By employing a variety of inputs in determining a suitable policy to be implemented in response to a service request, the policy management system 200 can provide a balance between network congestion and a subscriber's potential revenue-generating power.

For example, when having to choose among a gold-level subscriber browsing the Internet, a bronze-level subscriber downloading revenue generating content, an enterprise subscriber doing corporate email, or a government safety official (e.g. police officer) transmitting video from her car, there are many factors to consider. To intelligently manage subscribers in congested zones, multiple inputs are required to make decisions. If a subscriber generates 25 MB in a single hour for a single cell site, it is unlikely that an operator would desire the subscriber's usage to be throttled/capped for being "excessive" if they are, in fact, downloading revenue-generating, premium content (e.g. purchasing music or video content). The present invention enables operators, via the policy management system 200, to make informed decisions about how to react during times of congestion or predicted congestion, based on what they know about subscriber type (high-value versus low-value), service type (premium versus non-premium content), and application type (critical versus non-critical), as well as what they know about network elements and traffic on those elements.

In one embodiment, the network operator utilizes the policy configuration system 220 to configure the policy management system 200 with configuration information regarding the network capacity planning and forecasting system 380. This configuration information preferably comprises a) a network address and a preferred access method to be employed by the policy management system 200 to access the network capacity planning and forecasting system 380; b) identification and authentication information to be employed by the policy management system 200 to access the network capacity planning and forecasting system 380; and c) a frequency with which the policy management system 200 should access the network capacity planning and forecasting system 380.

The policy management system 200 will then query the network capacity planning and forecasting system 380 in order to obtain predictive information relating to resource utilization. Preferably, the frequency with which the policy management system 200 will query the network capacity planning and forecasting system 380 will be in the range of once every 10 minutes to once every 24 hours. However, it will be appreciated that any suitable frequency range may be employed, and the query could be sent on demand, or out of schedule when a particularly important or resource-intensive request is received.

In this embodiment, it will be appreciated that the predictive information is made available to the policy configuration system 220 and can be selectively employed by the network operator in configuring policy and charging rules decision logic. The predictive information may be transmitted directly to the policy configuration system 220 by the network capacity planning and forecasting system 380 or may be transmitted indirectly to the policy configuration system 220 by the policy management system 200.

Figure 4:
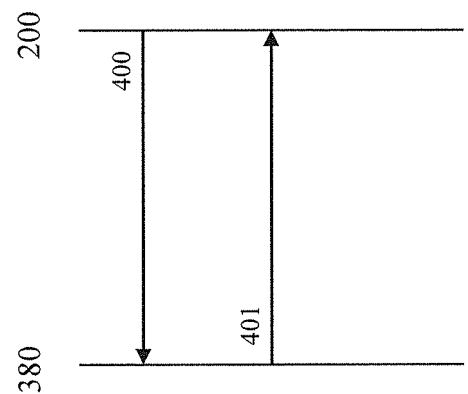
FIG. 4 is a message flow depicting a transmission of prediction information between the policy management system and the network capacity planning and forecasting system of FIG. 3.

This first embodiment is depicted in a message flow of FIG. 4. As illustrated, the policy management system 200 sends 400 a predictions request to the network capacity planning and forecasting system 380. The predictions request comprises a parameter specifying a type of prediction of interest to the policy management system, which is typically expressed as a resource utilization range. In response, the network capacity planning and forecasting system 380 transmits 401 a predictions response message, which preferably comprises at least one indicator relating to resources having utilization within the specified range.

In a second embodiment, the policy configuration system 220 is arranged to periodically update the policy management system 200. In this embodiment, the network operator utilizes the policy configuration system 220 to configure the network capacity planning and forecasting system 380 with configuration information regarding the policy management system 200. This configuration information preferably comprises a) a network address and a preferred access method to be employed by the network capacity planning and forecasting system 380 to access the policy management system 200; b) identification and authentication information to be employed by the network capacity planning and forecasting system 380 to access the policy management system 200; and c) a frequency with which the network capacity planning and forecasting system 380 should update the policy management system 200 with forecast information.

Again, in this embodiment, it will be appreciated that the predictive information is made available to the policy configuration system 220, either directly from the network capacity planning and forecasting system 380, or indirectly, from the policy management system 200. The policy management system 200 can then incorporate the predictive information into the policy and charging control rules decision logic, if desired.

Figure 5:
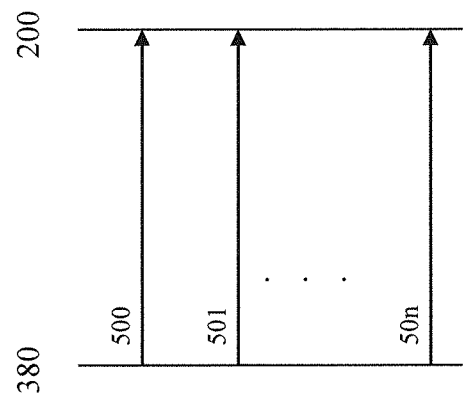
FIG. 5 is message flow depicting an alternative transmission of prediction information between the policy management system and the network capacity planning and forecasting system of FIG. 3.

This second embodiment is depicted in a message flow of FIG. 5. In this embodiment, the policy management system 200 preferably subscribes to the network capacity planning and forecasting system for a particular type of prediction requests. For example, the prediction requests may comprise a parameter specifying a type of prediction of interest to the policy management system, which is typically expressed as a resource utilization range. As illustrated, the network capacity planning and forecasting system 380 transmits 500, 501 . . . 50n, periodically a predictions message to the policy management system 200. Optionally, the policy management system 200 can send an acknowledgment message to the to the network capacity planning and forecasting system 380 to acknowledge receipt of the predication messages received. The predictions message preferably comprises at least one indicator relating to resources having an utilization within the range specified by the policy management system 200 as being of interest.

There is further provided a third embodiment, in which the policy configuration system 220 configures both the network capacity planning and forecasting system 380 and the policy management system 200 with the necessary configuration information to thereby allow the network capacity planning and forecasting system 380 to transmit periodically forecast information to the policy management system 200, as well as allowing the policy management system 200 to query the network capacity planning and forecasting system 380 for the forecast information. As with the first and second embodiments, the predictive information is provided directly or indirectly to the policy configuration system 220 such that it can be selectively incorporated into the policy and charging control rules decision logic.

Figure 6:
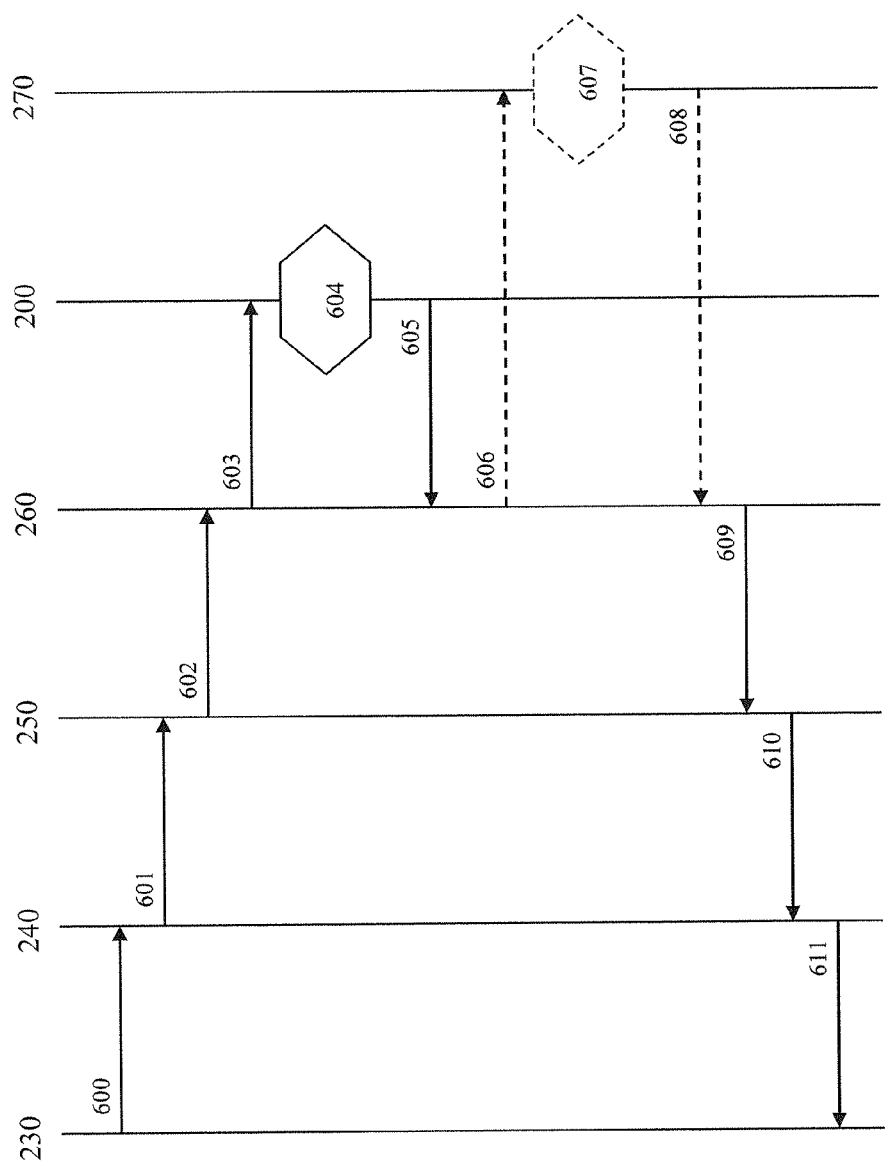
FIG. 6 is a message flow depicting a change of events instigated by a subscriber requesting to communicate with a destination, according to an embodiment.

Referring now to FIG. 6, there is illustrated a message flow depicting a change of events instigated by a subscriber requesting to communicate with a destination accessible via the external network 270 according to the method of the first embodiment.

A service request is sent 600 from the user equipment 230 to the cell 240 using the radio network 241, (FIG. 2 and FIG. 3). As previously discussed, the service request preferably includes a sufficient number of parameters to describe the service and the service provider on the external network. For example, these parameters may include a user equipment identity, a subscriber identity, a source IP address and port number, a destination IP address and port number, and a network protocol type.

On receipt of the service request, the cell 230 sends 601 the service request to the cell controller 250 using the backhaul network 251, (FIG. 2 and FIG. 3). The cell controller 250 then sends 602 the service request to the gateway 260.

When the gateway 260 receives the service request, it sends 603 a policy decision request to the policy management system 200 in order to determine the policy and charging control decisions to be implemented for the service request. The policy decision request preferably comprises at least one of the subscriber identity, user equipment identity, user equipment location, identity of the cell containing the user equipment, and information regarding a requested service specified in terms of a source IP address and port number, a destination IP address and port number, and a network protocol type. This enables the policy management system 200 to make a policy and charging control decision.

The policy management system 200 determines 604 whether to allow or deny the service request. In order to do so, the policy management system 200 utilizes predictive information received from the network capacity planning and forecasting system 380. The policy management system may also utilize information such as a subscriber's identity, a subscriber type, the current day and time, and a requested service type to determine whether to allow or deny the service request. Once a decision has been made, the policy management system 200 responds 605 to the gateway 260 with the policy decision response.

If the policy decision response is affirmative, as represented by dashed lines in the message flow, the gateway 260 sends 606 the service request to the external network 270. The external network then delivers the service request to an intended destination for fulfilment, and subsequently receives 607 a service response. The external network 270 sends 608 the service response to the gateway 260.

The gateway 260 sends 609 the service response from the intended destination, or in the case that the policy decision response is negative, an error message, to the cell controller 250. The cell controller 250 sends 610 the service response, or error message to the cell 240, from where it is sent to the user equipment 230 via the radio network 241.

Figure 7:
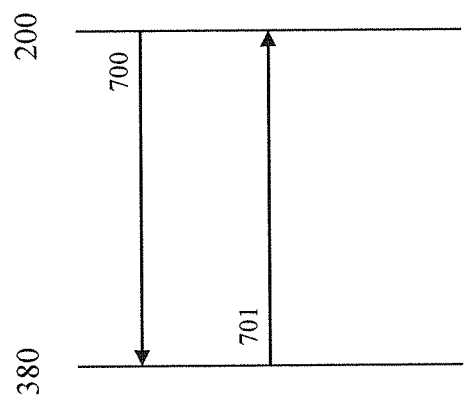
FIG. 7 is a message flow depicting a feedback control mechanism associated with the policy management system of FIG. 3.

In a further aspect of the invention, the policy management system 200 is arranged to notify the network capacity planning and forecasting system 380 of an identifier of resources whose resource utilization is likely to be affected by the policy and charging control rules that were applied. Referring to FIG. 7, there is provided a message flow depicting a feedback control mechanism associated with the policy management system 200. As depicted, the policy management system 200 sends 700 a feedback control notification to the network capacity planning and forecasting system 380. The feedback control notification preferably comprises details of a result of applying at least one policy and charging rule, including an identifier, any resources whose resource utilization is likely to be affected by the applied rule, and an extent of this effect. In response to receipt of the feedback control notification, the network capacity planning and forecasting system 380 sends 701 a feedback control acknowledgement.

The network capacity planning and forecasting system can subsequently use this feedback information when it is making future predictions. For example, under normal circumstances the network capacity planning and forecasting system might not report a resource with a utilization that is not being maximised. However, if the network capacity planning and forecasting system is aware that this under utilization is only occurring due to the enforcement of a restrictive policy and charging control rule, then it will report the resource as having a maximum utilization.

The present invention enables operators to deploy network resource policies in a more intelligent and targeted fashion, including:

Busy hour fair usage—each subscriber receives a usage limit for peak period(s)

Cell site fair usage—identifies excessive subscribers on a per-cell basis or per-cell group basis during small increments of time (e.g. 30 MB per hour per cell or group of cells);

Service prioritization—gives operators the ability to ensure premium services or plans received preferred treatment in congested areas of the network; and Service throttling—time shifts large volumes of usage for applications such as peer-to-peer to off-peak periods in congested areas of the network.

In one embodiment, through interaction with the gateway 260, the policy management system 200 directs the enforcement of certain actions, such as:

QoS controls—increasing or decreasing the throughput and priority of sessions or services on the uplink or downlink separately;

Blocking of traffic—block session or services as instructed by the policy management system 200;

Redirection of traffic—manipulate IP packets to redirect specific services such as HTTP to landing pages/portals.

These actions are important for controlling uplink and downlink traffic. Approximately 70% of overall bandwidth occurs on the downlink. In cases where QoS is reduced, the IP windowing changes on a subscriber session. This means the number of packets transmitted to the radio network 241 is reduced. Since fewer packets travel across the backhaul network 251, it has a positive effect on radio network 241 resources. Dropping packets on the uplink works similarly to downlink, except early packets travel across radio networks 241 and backhaul networks 251 before the device slows transmission of packets, which has a positive effect on the radio network 241 resources.

The present invention can be employed in various situations to provide an effective method for optimizing network capacity.

For example, the present invention can be employed in order to reduce congestion in a network. Consider the situation whereby the policy management system 200 sends a predictions request to the network capacity planning and forecasting system 380, subscribing to receive predictive information about cells 240 and cell controllers 250 experiencing high levels of congestion on the radio network 241 and the backhaul network 251. The policy management system 200 subsequently uses the resulting predictive information to apply greater restrictions on the traffic passing through the gateway 260, if this traffic is originating or terminating in a cell 240 that is suffering from congestion.

The gateway 260 may inform the subscriber, via any suitable communications method, such as via an SMS notification or a HTTP Redirect to a descriptive web page, of the restriction that is being applied, and the likely duration of this restriction. This restriction will have the effect of reducing the congestion on the radio network 241 and the backhaul network 251. Thus, the predictive indicators are being used in this case to determine policy and charging control decisions that reduce network congestion.

In another example, the present invention can be employed in order to encourage a subscriber's utilization. Consider the situation whereby the policy management system 200 sends a request to the network capacity planning and forecasting system 380 subscribing to receive predictive information about cells 240 and cell controllers 250 that are experiencing low levels of resource utilization on the radio network 241 and the backhaul network 251. The policy management system 200 subsequently uses the resulting predictive information to modify the policy and charging controls being applied to the traffic passing through the gateway 260, if this traffic is originating or terminating in a cell that is currently being under utilized. An application of this case occurs when subscribers associated with the affected cells 230 are offered a discounted service price for the duration of the predicted under-utilization. Thus, the predictive information is being used in this use case to determine policy and charging control decisions that encourage network utilization.

The invention is not limited to the embodiment(s) described herein but can be amended or modified without departing from the scope of the present invention.

The invention claimed is:

1. A computer-implemented method of determining policy control decisions in a cellular mobile telecommunications network, the method comprising the steps of:
 a policy management system receiving a predictive indicator from a forecasting system, wherein the predictive indicator includes predictive network resource utilization information indicating times and durations for which resource utilization in the cellular mobile telecommunications network is expected to deviate from a basic resource utilization range for a defined part of the cellular mobile telecommunications network;
 responsive to receiving a service request from a gateway, said policy management system determining a policy decision based on the predictive indicator, the policy decision determining whether to allow or deny the service request; and
 said policy management system sending the policy decision to the gateway;
 wherein the policy management system is further arranged to notify the forecasting system of an identifier of resources whose resource utilization is likely to be affected by the policy decision based on the predictive indicator, and sent to the gateway.

2. The computer-implemented method of claim 1, wherein the step of determining a policy decision is further based on the service request.

3. The computer-implemented method of claim 1, wherein the service request comprises at least one of a subscriber identity, user equipment identity, user equipment location, identity of a cell containing the user equipment, and information regarding the requested service request.

4. The computer-implemented method of claim 3, wherein the information regarding the requested service request is specified in terms of a source IP address and port number, a destination IP address and port number, and a network protocol type.

5. The computer-implemented method of claim 1, wherein the step of determining a policy decision is further based on subscriber data.

6. The computer-implemented method of claim 1, further comprising extracting a subscriber identifier from the service request, and utilizing the subscriber identifier to retrieve subscriber data.

7. The computer-implemented method of claim 6, wherein the subscriber data comprises at least one of a subscriber's name, age, subscription type, subscription add-ons, account balance, total usage allowances, remaining usage allowances, allowed service information, and current location information.

8. The computer-implemented method of claim 1, wherein the step of determining a policy decision is further based on any one of historical data, subscriber data, real-time network resource utilization, ongoing service information, operator policy information and network restrictions.

9. The computer-implemented method of claim 1, further comprising receiving ongoing service information from an application layer function, wherein the policy decision is further based on the ongoing service information.

10. The computer-implemented method of claim 1, further comprising transmitting to the forecasting system, a request for a predictive indicator.

11. The computer-implemented method of claim 1, further comprising transmitting to the forecasting system periodically, a request for a predictive indicator.

12. The computer-implemented method of claim 1, further comprising subscribing to the forecasting system to periodically receive a predictive indicator.

13. The computer-implemented method of claim 11, wherein the subscribing comprises transmitting a request.

14. The computer-implemented method of claim 1, wherein the service request comprises at least one parameter indicating desired predictive network resource utilization information.

15. The computer-implemented method of claim 14, wherein the at least one parameter includes at least one of geographical location, specific types of resources, specific resources, dates and times, and a contribution or load factor range.

16. The computer-implemented method of claim 1, further comprising a step of receiving from a policy configuration system, policy control decision logic, and wherein the policy decision is determined in accordance with the policy control decision logic and the predictive indicators.

17. The computer-implemented method of claim 1, further comprising a step of receiving from a policy configuration system, policy control decision logic derived from predictive indicators received from the forecasting system, and wherein the policy decision is determined in accordance with the predictive indicator derived policy control decision logic and the predictive indicators.

18. The computer-implemented method of claim 1, wherein the policy management system is arranged to receive from a policy configuration system, configuration information for communicating with the forecasting system.

19. The computer-implemented method of claim 18, wherein the configuration information comprises at least one of:
 a) a network address and a preferred access method to be employed by the policy management system to access the forecasting system;
 b) identification and authentication information to be employed by the policy management system to access the forecasting system; and
 c) a frequency with which the policy management system is to access the forecasting system.

20. A policy management system in a cellular mobile telecommunications system, the policy management system arranged to:
 receive a predictive indicator from a forecasting system, wherein the predictive indicator includes predictive network resource utilization information indicating times and durations for which resource utilization in the cellular mobile telecommunications system is expected to deviate from a basic resource utilization range for a defined part of the cellular mobile telecommunications system;
 responsive to receiving a service request from a gateway, determine a policy decision based on the predictive indicator, the policy decision determining whether to allow or deny the service request; and
 send the policy decision to the gateway;
 wherein the policy management system is further arranged to notify the forecasting system of an identifier of resources whose resource utilization is likely to be affected by the policy decision based on the predictive indicator, and sent to the gateway.

21. A computer program product comprising a non-transitory computer readable medium encoded with computer executed instructions, which when executed in a computing device, is arranged to cause a policy management system to carry out the following steps:

receive a predictive indicator from a forecasting system, wherein the predictive indicator includes predictive network resource utilization information indicating times and durations for which resource utilization in a cellular mobile telecommunications network is expected to deviate from a basic resource utilization range for a defined part of the cellular mobile telecommunications network;

responsive to receiving a service request from a gateway, to determine a policy decision based on the predictive indicator, the policy decision determining whether to allow or deny the service request; and send the policy decision to the gateway;

wherein the policy management system is further arranged to notify the forecasting system of an identifier of resources whose resource utilization is likely to be affected by the policy decision based on the predictive indicator, and sent to the gateway.

22. A computer-implemented method of determining policy control decisions in a cellular mobile telecommunications network, the method comprising the steps of: a policy management system receiving policy control decision logic from a policy configuration system, wherein the policy control decision logic is derived from a predictive indicator including predictive network resource utilization information indicating times and durations for which resource utilization in the cellular network is expected to deviate from a basic resource utilization range for a defined part of the cellular mobile telecommunications network;

responsive to receiving a service request from a gateway, said policy management system determining a policy decision based on the policy control decision logic, the policy decision determining whether to allow or deny the service request; and sending the policy decision to the gateway;

wherein the policy management system is further arranged to notify the forecasting system of an identifier of resources whose resource utilization is likely to be affected by the policy decision based on the predictive indicator, and sent to the gateway.

23. A cellular mobile telecommunications system comprising:

a policy management system;

a policy configuration system, which is arranged to transmit to the policy management system, policy control decision logic;

a network capacity planning and forecasting system, arranged to transmit to the policy management system, predictive indicators in respect of utilization of network resources indicating times and durations for which resource utilization in the cellular mobile telecommunications system is expected to deviate from a basic resource utilization range for a defined part of the cellular mobile telecommunications system;

a gateway, arranged to transmit to the policy management system, service requests; wherein the policy management system is arranged to transmit a policy decision to the gateway in response to a service request; and wherein the policy decision is determined in accordance with the policy control decision logic and the predictive indicators, the policy decision determining whether to allow or deny the service request;

wherein the policy management system is further arranged to notify the forecasting system of an identifier of resources whose resource utilization is likely to be affected by the policy decision based on the predictive indicator, and sent to the gateway.

24. A computer-implemented method of configuring a policy management system in a cellular mobile telecommunications network, the method comprising the steps of:

receiving configuration parameter from an operator;

receiving from a forecasting system, a predictive indicator including predictive network resource utilization information indicating times and durations for which resource utilization in the cellular mobile telecommunications network is expected to deviate from a basic resource utilization range for a defined part of the cellular mobile telecommunications network;

generating policy control decision logic based on the configuration parameters and the predictive indicator, the policy decision logic determining whether to allow or deny the service request; and transmitting to the policy management system, the policy control decision logic wherein the policy management system is further arranged to notify the forecasting system of an identifier of resources whose resource utilization is likely to be affected by the policy control decision logic based on the predictive indicator, and sent to the gateway.

25. The computer-implemented method of claim 24, further comprising transmitting to the policy management system, configuration information to enable the policy management system to communicate with the forecasting system.

26. The computer-implemented method of claim 25, wherein the configuration information comprises at least one of:

a) a network address and a preferred access method to be employed by the policy management system to access the forecasting system;

b) identification and authentication information to be employed by the policy management system to access the forecasting system; and c) a frequency with which the policy management system is to access the forecasting system.

27. The computer-implemented method of claim 24, further comprising transmitting to the forecasting system, configuration information to enable the forecasting system to communicate with the policy management system.

28. The computer-implemented method of claim 27, wherein the configuration information comprises at least one of:

a) a network address and a preferred access method to be employed by the forecasting system to access the policy management system;

b) identification and authentication information to be employed by the forecasting system to access the policy management system; and c) a frequency with which the forecasting system is to update the policy management system with a predictive indicator.

29. The computer-implemented method of claim 16, wherein the policy control decision logic further includes charging control decision logic.

* * * * *